United States Patent [19]

Haines, Jr.

[11] 3,907,524

[45] Sept. 23, 1975

[54] VAPOR RECOVERY METHOD FOR CONTROLLING AIR POLLUTION

[75] Inventor: Harry William Haines, Jr., Houston, Tex.

[73] Assignee: Emission Abatement, Inc.

[22] Filed: Dec. 13, 1973

[21] Appl. No.: 427,033

[52] U.S. Cl. .................................................. 55/88
[51] Int. Cl.² ........................................ B01D 53/14
[58] Field of Search ........................... 55/68, 88, 220

[56] References Cited
UNITED STATES PATENTS

| | | |
|---|---|---|
| 2,853,149 | 9/1958 | Gosselin .................................. 55/88 |
| 3,763,901 | 10/1973 | Viland ..................................... 55/88 |
| 3,770,622 | 11/1973 | Freireich et al. ....................... 55/68 |

*Primary Examiner*—Charles N. Hart
*Attorney, Agent, or Firm*—Pravel & Wilson

[57] ABSTRACT

A vapor recovery method is disclosed wherein gases contaminated with vapors from volatile organic liquids are recovered by contacting the vapor-containing gas in an absorbing tower with a sponge oil which absorbs the vapors. The sponge oil rich in absorbed vapors is conveyed to a flash tank wherein the absorbed vapors are removed and recovered. The clean gas is vented to the atmosphere and the sponge oil can be successfully reused.

5 Claims, 1 Drawing Figure

US Patent  Sept. 23, 1975  3,907,524
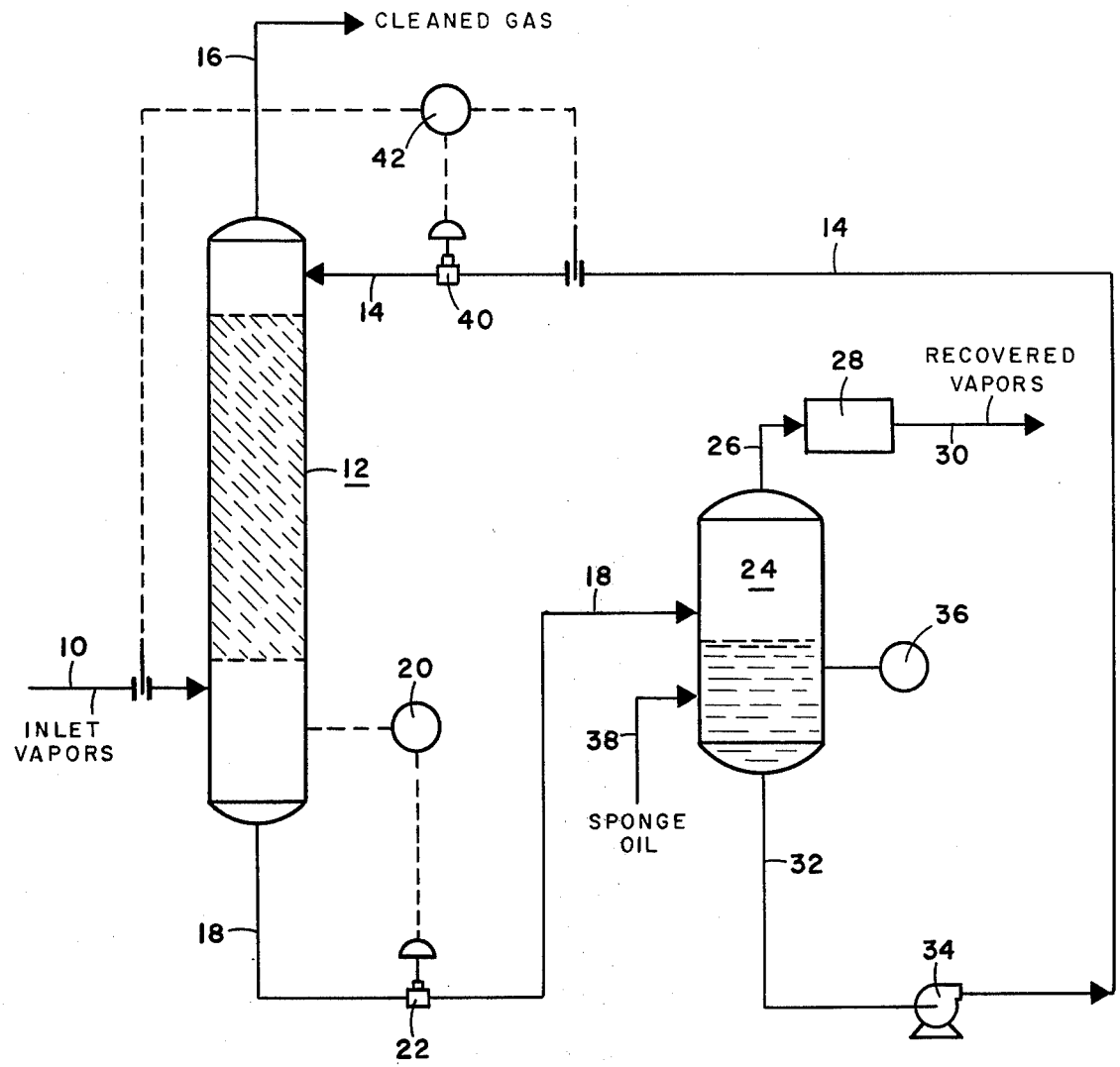

VAPOR RECOVERY METHOD FOR CONTROLLING AIR POLLUTION

BACKGROUND OF THE INVENTION

The field of this invention relates to the methods for controlling air pollution due to vapor emissions from volatile liquids such as chemicals, hydrocarbons, and particularly petroleum fuels such as gasoline.

With increasing awareness of the detrimental effects upon the environment by releasing thereto vapors of volatile liquids such as organic chemicals and hydrocarbons emitted from process unit vent systems, hydrocarbon compound vapors from storage tanks and transport tanks when being filled and from petroleum fuels when being transferred into storage tanks or transport trucks at loading racks, particularly, the necessity of recovery of these vapors has increased.

In loading truck, railroad, ship and other tanks with volatile organic liquids such as hydrocarbons and chemicals and, in particular, gasoline, the space within the tank decreases progressively as the tank is filled and vaporized liquids are forced from the tank into the atmosphere, creating health, fire, pollution and explosion problems. Not only are these problems created, but valuable materials are lost.

Many vapor recovery systems have been described for use in attempting to recover vapors of volatile liquids and clean the atmosphere or other gas. Some attempts are described, for example, in U.S. Pat. Nos. 2,899,013 and 2,885,109 which involves the compression of gases containing vapors of volatile liquids. U.S. Pat. No. 2,077,019 describes the absorption of such vapors in a calcium chloride brine solution, and U.S. Pat. Nos. 3,589,104 and 3,648,436, for example, describe systems wherein vapor recovery is attempted utilizing refrigeration means. Other attempts at recovering vapors of volatile liquids from gases such as air are variously described in U.S. Pat. Nos. 2,853,149 and 3,581,782. All these systems described in the foregoing patents have certain disadvantages as size, lack of flexibility to changing conditions, and energy consumption, for example, which makes them undesirable.

Accordingly, it is the object of my invention to provide an efficient system for recovering vapors of volatile liquids to prevent the contamination of the environment therewith.

It is a particular object of my invention to provide a compact system and method for recovering the vapors of volatile liquids which can be easily transported from one location to another.

The above and other objects will become apparent from the following description of the invention.

DESCRIPTION OF THE DRAWING

The attached drawing is a schematic diagram of the process and apparatus of my invention with many obvious valves, fittings and gages omitted therefrom.

SUMMARY OF THE INVENTION

Vapors of volatile liquids emanating from vapor sources such as a storage tank, transfer tank, operating unit vent, etc., are removed from gases such as air, for example, and pollution of the air is prevented by transmitting the gas contaminated with vapors of volatile liquids from the vapor source through a conduit to an absorbing tower wherein it is contacted by countercurrent flow with a lean sponge oil which absorbs the vapor of the volatile liquid from the gas. The rich sponge oil is then transmitted from the bottom of the tower to a vacuum flash tank wherein the vapors are desorbed, or flashed, from the sponge oil. The vapors are then recovered as liquid and preferably returned to stored liquids of the same kind, thus effecting conservation of valuable materials. The stripped, or lean, sponge oil is then returned to the absorbing tower where it again contacts the gases contaminated with the vapors of the volatile hydrocarbon. The gases thus cleaned are vented to the atmosphere from the absorbing tower.

DESCRIPTION OF THE PREFERRED EMBODIMENTS

The vapors recovered in the practice of my invention emanate from a vapor source such as transfer tanks for gasoline and other petroleum fuels, storage tanks and chemical processing plants. The vapors recovered in the practice of my invention can be either organic chemical products, organic hydrocarbons or vapors from petroleum fuels. It is generally applicable to recover vapors from substantially any volatile organic liquid. Generally, the gas contaminated is air and recovery is made necessary not only to avoid air pollution and for safety consideration, but also to prevent waste of valuable products.

Referring to the drawing, the gas contaminated with the vapors of a volatile organic liquid is captured at the vapor source by any well-known method and conducted through a conduit 10 to an absorbing tower 12. While any type of absorbing tower wherein the absorbing liquid flows countercurrent to the upward flow of the gas being cleaned may be used, it is preferred that a packed or trayed tower having at least one theoretical contact stage, preferably about two to about five theoretical contact stages, be used.

The vapor-contaminated gas entering the tower 12 through the conduit 10 generally contains in excess of 75 millimeters mercury partial pressure of the vapors being recovered. I have found that the operation of my invention is also very efficient with high vapor loadings in the gas. The inlet pressure of the gas into the absorber 12 range from approximately 760 MM Hg to about 1200 MM Hg absolute pressure. While greater pressures are tolerable in the practice of my invention, one advantage to the invention is to operate at substantially atmospheric pressure and still recover substantially all of the vapors of the volatile organic liquid from the gas being cleaned at ambient temperatures. If the inlet pressure of the gas is too low, a blower may be used for transporting the gas through the conduit 10 to the absorber 12, attainging as a maximum absolute pressure in this mode of operation, about 1200 millimeters of mercury.

The vapors are countercurrently contacted in the absorber 12 with a lean sponge oil entering through line 14. The cleaned gas, in most cases air, is vented to the atmosphere through line 16. These vent gases will be substantially free of vapors of the volatile organic liquid. The sponge oil rich in absorbed vapors exits the column 12 through line 18.

The selection of the sponge oil used in the absorbing tower 12 depends, of course, upon the characteristics of the vapor being absorbed and the volatility of the liquid phase. In making the selection, the sponge oil is defined generally as a hydrocarbon liquid which is nonreactive with the absorbed vapors, having a true vapor pressure not greater than 10% of the true vapor pressure of the volatile organic liquid from which the vapor is derived. As a rule of thumb, a sponge oil can be selected having a molecular weight which is at least about 1.5 times the average molecular weight of the vapors being absorbed. It is preferred that the sponge oil average molecular weight be from about 2.5 to about 3.0 times the average molecular weight of the vapors being absorbed.

The sponge oil is circulated over the absorbing tower such that it circulates in a ratio of about 4 to about 9 mols of sponge oil per mol of vapor entering with the gas through the conduit 10 into the absorbing tower 12. The molar ratio would preferably range from about 5.5:1 to about 7:1. If the number of theoretical equilibrium contact stages in the absorbing tower 12 are reduced, the sponge oil molecular weight and circulation rate can be increased to obtain equivalent removal of the vapor. Conversely, if the number of theoretical equilibrium contact stages are increased, the sponge oil molecular weight and circulation rate can be decreased.

The liquid level of the sponge oil is maintained in the bottom of the absorption tower by a controller 20 which operates control valve 22 in line 18 regulating the flow of the vapor rich sponge oil from the absorber 12 in line 18 to flash tank 24. In the flash tank 24, the vapors are removed from the rich sponge oil through line 26 by a vacuum producing means 28. The thus recovered vapors of the volatile organic liquid are transported by line 30 to a suitable system wherein they are either condensed by compression and/or refrigeration or absorbed in the volatile organic liquid itself. In any case, the practice of my invention allows the recovery of valuable organic liquid materials, particularly hydrocarbons and fuels, such as gasoline, which would otherwise be lost and pollute the environment.

The vaccum means 28 attached to the flash tank 24 for reducing the pressure in said flash tank 24 in order to remove the vapors of the liquid organic material from the sponge oil can be any suitable means known to those of orginary skill in the art such as rotary lobe blowers, sliding vane vacuum pumps, reciprocating vacuum pumps, and the like, or a combination of the foregoing. The particular vacuum means employed would be dictated by the vapor loading of the gas originally being absorbed and the amount which must be removed from the sponge oil in the flash tank 24. One of the particular advantages of the practice of my invention is that the absorber, flash tank, and vacuum system can all be tailored to the particular vapor of volatile organic liquid being recovered. This results in a substantial savings of energy to achieve substantially quantitative recovery of the vapors and protect the environment. In gasoline recovery systems particularly, this allows very compact, portable systems to be constructed which can be skid-mounted and easily moved to different locations.

While a single flash tank is generally satisfactory in the operation of the system of this invention, there may be complications wherein two stages of desorption would be desirable and more efficient, thus a second flash tank operated at lower atmospheric pressure than the first flash tank could be used. In the operation of the flash tank 24, the sponge oil will be regenerated using an absolute pressure of from about 10 to about 760 millimeters mercury and preferably at ambient temperature. Generally, unless the sponge oil being used has a high vapor pressure, the lower absolute pressures are desirable for the operation of the flash tank in order to more completely remove the absorbed vapors from the sponge oil. Generally, the operation of the flash tank will be at an absolute pressure of less than about 75 millimeters of mercury. The maintenance of the vacuum in the flash tank and the recovery of the desorbed vapors have been discussed hereinbefore.

The sponge oil in the vacuum tank 24 having had the vapors stripped therefrom is now lean of absorbed vapors and exits the flash tank 24 through line 32, through circulating pump 34, and thence to line 14 from which it is recirculated to the absorber 12. The flash tank 24 can be selected to be of sufficient size to act as the sponge oil surge tank having its liquid level monitored by a gage 36. Makeup sponge oil when necessary can be added to tank 24 through line 38 to maintain a desired level in the tank. Since the flash tank 24 is operated at a vacuum and the absorber 12 is operated at a super-atmospheric pressure, the rich sponge oil will flow through line 18 without the requirement of a pump.

It is preferable to operate the process of my invention by controlling the oil to vapor ratio through the amount of lean sponge oil entering the absorber 12 through line 14. This is done by opening and closing automatic control valve 40 responsive to signals from an automatic controller 42 which monitors both the inlet vapor flow rate and the lean sponge oil flow rate.

In addition to saving energy by recovering vapors which would otherwise be lost, the absorption and desorption operations of the process of this invention can be carried out at substantially atmospheric temperatures such that the energy requirement is minimized and the unit operates virtually under isothermal conditions. However, wherein more difficult separations are encountered, the lean sponge oil may require cooling prior to absorption and/or heating prior to recovery of the vapors in the flash tank. In case where such is required, it is preferable to limit the cooling to minus 20°C. and heating to 200°C. Heat exchange equipment well-known to those skilled in the art would have practical application in such instances.

It is a particular advantage of the process of this invention is that it can be readily adapted to specific operations wherein specific vapors are to be recovered by following the foregoing discussed parameters. It is also adaptable to many sizes of operations and inlet vapor rates. Further, after having been in operation, it can also be adjusted to meet more stringent environmental requirements through simple changes such as increasing the vacuum on the flash tank 24 and operating the absorber 12 at higher pressures such as from about 3 to about 4 atmospheres. Such changes are within the scope of this invention and can be accomplished by simple equipment changes and modifications whereas prior art processes would require complete overhaul, if adaptable to such conditions at all.

In a typical operation of the process of this invention wherein gasoline vapors are to be recovered from a vented storage tank being filled at a rate of about 1,000 gallons of gasoline per minute, the vapors would enter the absorber 12 at a rate of approximately 130 cubic feet per minute. The partial pressure of gasoline within the vent vapors being charged to the absorber 12 would, of course, depend upon the ambient temperature. The gases carrying the gasoline vapors are contacted in the absorber 12 in a countercurrent manner with a sponge oil having an average molecular weight of about 200. The absorbing tower 12 contains three theoretical equilibrium contact stages. The sponge oil/vapor molar ratio in this application would be approximately 6.5 to 1.

The rich sponge oil, after having contacted the gas containing the gasoline vapors, passes through line 18 to the flash tank 24 which is operated at about 50 MM Hg absolute pressure. The cleaned gases from the absorber are vented to the atmosphere through line 16 substantially free of any gasoline vapors. The recovered gasoline vapors leave the flash tank 24 through line 26 and are recovered by returning the gasoline to the storage tank. The lean sponge oil from which the gasoline has been stripped in the flash tank 24 leaves the flash tank 24 through line 32 and pump 34 to line 14 where it is recirculated to the absorbing tower 12.

While the preferred embodiment of the invention is discussed above, it will be understood that those of ordinary skill in the art may make various changes and modifications in its construction and operation without departing from the scope of the invention as defined in the appended claims.

I claim:

1. A process for recovery of vapors of volatile organic liquids from gases which comprises the steps of:
   a. contacting in countercurrent flow the vapor containing gases with a sponge oil in an absorption tower having at least one theoretical equilibrium stage wherein the sponge oil has a true vapor pressure of less than about 10% of the true vapor pressure of the volatile organic liquid at the ambient temperatures;
   b. flashing the absorbed vapors from the sponge oil;
   c. recovering the flashed vapors; and
   d. venting the gases substantially free of vapors of the volatile organic liquid to the atmosphere.

2. The process of claim 1 wherein the sponge oil has an average molecular weight of from about 1.5 to about 3.0 times the average molecular weight of the liquid organic hydrocarbon.

3. The process of claim 1 wherein the flashed sponge oil is recirculated to the absorption tower.

4. The process of recovering gasoline vapors from contaminated air which comprises the steps of:
   a. conducting the vapors and air from a vapor source to an absorbing tower;
   b. contacting the vapors in countercurrent flow in the tower, having at least one theoretical equilibrium stage, with a sponge oil having a molecular weight at least about 1.5 times the average molecular weight of gasoline to absorb gasoline vapors from the air;
   c. venting clean air to the atmosphere;
   d. flashing the sponge oil to remove absorbed gasoline from the sponge oil;
   e. recovering the gasoline; and
   f. recirculating the sponge oil to the absorbing tower.

5. The process of claim 4 wherein the tower is operated at an absolute pressure of about 760 to about 1200 millimeters of mercury and the flashing step is accomplished at an absolute pressure of from about 10 to about 760 millimeters of mercury.

* * * * *